(12) United States Patent
Kaufmann

(10) Patent No.: US 8,667,896 B2
(45) Date of Patent: *Mar. 11, 2014

(54) SCREEN PRINT REFLECTION TRANSFER AND PROCESS FOR THE MANUFACTURE THEREOF

(71) Applicant: Harald Kaufmann, Hattingen (DE)

(72) Inventor: Harald Kaufmann, Hattingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/854,998

(22) Filed: Apr. 2, 2013

(65) Prior Publication Data

US 2013/0213248 A1  Aug. 22, 2013

Related U.S. Application Data

(63) Continuation of application No. 12/899,605, filed on Oct. 7, 2010, now Pat. No. 8,418,616, which is a continuation of application No. 11/548,979, filed on Oct. 12, 2006, now abandoned, which is a continuation of application No. 09/807,774, filed as application No. PCT/EP99/08036 on Oct. 22, 1999, now Pat. No. 7,946,226.

(30) Foreign Application Priority Data

Oct. 23, 1998 (DE) ................... 198 48 863
Apr. 8, 1999 (DE) ................... 199 15 713

(51) Int. Cl.
*B41M 3/12* (2006.01)
*B44C 1/175* (2006.01)

(52) U.S. Cl.
USPC ............... 101/491; 428/42.1; 428/914

(58) Field of Classification Search
None
See application file for complete search history.

(56) References Cited

U.S. PATENT DOCUMENTS

| | | |
|---|---|---|
| 2,354,049 A | 7/1944 | Palmquist |
| 3,165,153 A | 1/1965 | Lanmon |
| 3,172,942 A | 3/1965 | Berg |
| 3,420,597 A | 1/1969 | Schoonover et al. |
| 3,700,305 A | 10/1972 | Bingham |
| 3,971,692 A | 7/1976 | Anderson |
| 4,517,237 A | 5/1985 | Pernicano |
| 4,657,803 A | 4/1987 | Pericano |
| 4,664,735 A | 5/1987 | Pernicano |
| 4,849,265 A | 7/1989 | Ueda et al. |
| 4,902,670 A | 2/1990 | Kanto et al. |
| 4,939,674 A | 7/1990 | Price et al. |
| 5,200,268 A | 4/1993 | Hamada |
| 5,300,169 A | 4/1994 | Tahara |
| 5,358,281 A | 10/1994 | Greig |
| 5,503,906 A | 4/1996 | Olsen |
| 5,620,775 A | 4/1997 | LaPerre |
| 5,621,993 A | 4/1997 | Stover |
| 5,631,064 A | 5/1997 | Marecki |

(Continued)

FOREIGN PATENT DOCUMENTS

| | | |
|---|---|---|
| AT | 200691 | 11/1958 |
| DE | 200 691 | 11/1958 |

(Continued)

*Primary Examiner* — Joshua D Zimmerman
(74) *Attorney, Agent, or Firm* — Cahn & Samuels, LLP

(57) ABSTRACT

The invention relates to a method for manufacturing a screen print reflection transfer product and to reflection transfer systems produced by this method. According to said method, the reflecting color is provided with a multitude of reflecting particles, said reflecting particles protruding from the surface of the top color coat.

14 Claims, 3 Drawing Sheets

(56) References Cited

U.S. PATENT DOCUMENTS

| | | | |
|---|---|---|---|
| 5,633,836 | A | 5/1997 | Langer et al. |
| 5,674,605 | A | 10/1997 | Marecki |
| 5,837,347 | A | 11/1998 | Marecki |
| 6,060,157 | A | 5/2000 | LaPerre et al. |
| 6,277,229 | B1 | 8/2001 | Popat et al. |
| 6,372,341 | B1 | 4/2002 | Jung et al. |
| 6,465,071 | B1 | 10/2002 | Satch et al. |
| 6,667,095 | B2 | 12/2003 | Wheatley et al. |
| 7,946,226 | B1 * | 5/2011 | Kaufmann ............ 101/491 |
| 8,418,616 | B2 * | 4/2013 | Kaufmann ............ 101/491 |

FOREIGN PATENT DOCUMENTS

| | | |
|---|---|---|
| DE | 1446828 A1 | 2/1969 |
| EP | 0 503 738 | 9/1992 |
| GB | 867783 A | 5/1961 |
| GB | 1 273 895 | 5/1972 |
| JP | 04096041 | 3/1992 |
| JP | 04164647 | 6/1992 |
| JP | 04296838 | 10/1992 |
| JP | 05273652 | 10/1993 |
| JP | 05273655 | 10/1993 |
| JP | 08152684 A | 6/1996 |

* cited by examiner

SCREEN PRINT REFLECTION TRANSFER AND PROCESS FOR THE MANUFACTURE THEREOF

CROSS REFERENCE TO RELATED APPLICATIONS

This application is continuation application under 35 U.S.C. 120 of U.S. Ser. No. 12/899,605 filed on Oct. 7, 2010, which is a continuation application of U.S. Ser. No. 11/548,979, filed on Oct. 12, 2006 (abandoned), which is a continuation of U.S. Ser. No. 09/807,774, filed on Apr. 17, 2001 (U.S. Pat. No. 7,946,226), which is a national stage application of PCT international application PCT/EP99/08036 filed on Oct. 22, 1999, which claims priority from German patent document 198 48 863.7 filed on Oct. 23, 1998 and German patent document 199 15 713.8 filed on Apr. 8, 1999. The disclosures of all these patent documents are incorporated herein by reference in their entireties.

FIELD OF INVENTION

The invention relates to reflection transfer systems and to a process for the manufacture of a reflection transfer in the screen printing process. In accordance with the present invention, the term "reflection-transfer" refers to a transfer of which the reflective properties are based on the use of an ink or carrier material, in which a plurality of small reflecting particles are present.

BACKGROUND OF INVENTION

Said reflection inks have long been known. The reflection property of these inks is based on the fact that a plurality of small reflecting particles are contained in the ink mass. Such particles can be of spherical shape and consist of metal, glass, metal-coated glass, or metal-coated plastic. A suitable ink is marketed, for example, by the company of Sericol under the commercial name "Reflec 100" and "Reflec 200".

Inks are also known in which the reflection particles are present in the form of chips.

In the meaning of the present invention, the term reflection inks is also understood to mean colorless or transparent carriers and lacquers, as far as they contain reflection particles.

According to the prior art, such inks can only be used in the screen print direct process without the reflection properties being substantially impaired.

According to the screen print direct process, the reflection ink is applied directly onto a substrate. Textile and plastic stripes may be used as substrates. The printing of processed textiles, such as shirts, jackets, and T-shirts, is likewise possible.

The known screen print direct process comprises the following process steps:

1. Introducing and positioning the substrate to be printed into the printing device;
2. optionally printing/applying a primer coating; and
3. Printing/applying the reflection ink.

Depending on the properties of the primer coating being used and of the reflection ink, further drying steps between the individual process steps can be provided.

By means of the screen print direct process, high-quality prints can be manufactured on said substrates, whereby the reflection ink has very good reflection capability.

The screen print direct process however, has a plurality of drawbacks. The printing of made-up textiles such as shirts or jackets is extremely difficult, since the seams being present or other applications to the textile interfere with or impede the printing process. The exact positioning of the textile to be printed in the printing device is also necessary which leads to an increased amount of work. Additionally, the pre-manufactured textiles must be sent to the printing office, which causes increased transport expenditure. The printing of small series in each case involves the elaborate resetting of the printing device, which is also disadvantageous.

In particular, due to the frequent customer's need for the printing of small series which are then sold and may be required to be re-run, depending on the market demand, the need for the printing device to be equipped in each case with the corresponding printing devices leads to an increased amount of work and increased costs.

In order to meet customer s requirements for small series which can be re-run, to achieve higher machine utilization by reduced setting-up times, and to create the possibility, to make the application onto the substrate independent from the location of the printing device, transfer systems are known to be used.

The known screen print transfer systems are manufactured and used as follows:

Providing a transfer carrier, e.g. of siliconised or waxed paper;
Applying/imprinting the ink; and
Applying/imprinting an adhesive.

If it is intended that motifs are to be manufactured with said transfer systems, the motifs are to be printed onto the transfer carrier in a mirror-reversed fashion.

Such transfer systems can be manufactured in a simple manner, at reasonable cost and in large numbers.

The transfers manufactured can be sent to the customer and applied at that location, according to demand, by means of a simple transfer press, onto the desired substrates. In this respect, it is possible for the end purchaser to select a motif from a plurality of pre-prepared transfers, and to have the transfer applied onto a substrate being also individually selected by him. Using such transfer systems, it is possible for substrates to be prepared at almost any desired sales locations which are provided with motifs in accordance with the customer's needs.

Application is effected by the substrate being brought into the transfer press and positioned, the transfer having the adhesive coating being applied onto the substrate and positioned, the transfer being applied on the substrate by means of the transfer press with the aid of pressure and, if necessary, increased temperature, the substrate provided with the motif being removed from the transfer press and the transfer carrier being removed from the substrate.

It has been shown, however, that, using reflection inks in the known screen print transfer systems, the reflection inks provide hardly any reflection properties any longer after application onto the substrate which is undesirable.

DE-AS 14 46 828 discloses a process for the manufacture of a reflective transfer film, and the transfer films manufactured thereby, in which, on a carrier coated with a plastic softened in the heat, spherical reflection particles are incorporated under the effect of heat into the surface of the plastic coating. Next, a sequence of layers of a rubber binding agent, an optional heat blocking layer, an adhesive, and finally a second carrier is applied. Application is effected by the second layer being removed and the exposed adhesive side being bonded to the textile substrate under the application of heat. Finally, the plastic-coated carrier is removed.

U.S. Pat. No. 3,420,597 discloses a process for the manufacture of a highly reflective coating on a rigid substrate, such as a road sign. In this case, an ink containing fully metal-coated micro-spheroids is applied onto the substrate, whereby, after the ink mass has dried, the micro-spheroids are raised above the surface of the ink layer. In a further processing step, the metal coating of the spheroids which projects beyond the ink layer, is removed by etching, as a result of which an especially advantageous reflection capability is achieved.

U.S. Pat. No. 5,631,064 describes a process for the manufacture of a reflection transfer in which a backing layer is first applied, onto which a plastic layer capable of being softened under heating is applied, wherein reflecting spheroids are present in about 30-40% of their extent. Optionally, a mirror layer can be applied to the surface of the spheroids. In a two-step process, an artificial resin-binding agent is first applied to the surface of the spheroids, and then a transfer adhesive is imprinted. For a figurative representation, the print is to be applied in a mirror-reversed fashion.

The transfer is brought to application onto a substrate, such as a textile, with the transfer adhesive agent side and adhesively bonded in place. Finally, the backing layer with the heat-softenable plastic layer is removed, whereby the spheroids remain in the hardened binding agent layer.

AT-P-200 691 describes a fluid reflective coating agent, with which a reflection is effected by a plurality of small glass or metal particles.

The object of the present invention is to overcome the disadvantages of the prior art and to provide a screen print reflection transfer system and a process for the manufacture thereof, in which the reflection ink provides substantial reflection properties after transferring onto the substrate.

A further object of the present invention relates to the provision of a screen print reflection transfer system and a process for the manufacture thereof, whereby at least a part of the reflection particles of the reflection ink used according to the invention are raised above the dried ink layer.

The objects of the invention are achieved by the limitations of the independent claims. Preferred embodiments are presented in the dependent claims.

SUMMARY OF INVENTION

In this case, the invention is based on the perception that the reflections with the-reflection inks used according to the invention are achieved essentially by reflection particles which are raised above the surface of the hardened ink layer. In the meaning of the present invention, it is understood in this context that at least a part of the reflection particles being used project with a part of their surface out of the surface of the carrier layer.

The process for the manufacture of a screen print reflection transfer system according to the invention proceeds as follows:

First, a primer carrier, referred to hereinafter as the base medium, is placed for the transfer which is to be applied. The base medium can usually consist of a paper or plastic film with a surface which repels adhesives. The adhesive-repellant properties are achieved by siliconising or waxing the base medium. As base medium, all conventional and known adhesive-repellant films and strips can be used whereby the only restriction which applies is that the surface of the base medium is sufficiently adhesive-repellant in order to guarantee the non-destructive release of the adhesive layer being applied. A suitable base medium is marketed, for example, by the company of B. Laufenberg GmbH under the commercial name NP 950.

In the screen print process, a transfer adhesive is imprinted on the adhesive-repelling surface of the base medium. The imprinting is carried out in this case with the correct side to accord with the motif desired. This is possible for different, freely-selectable motifs, as a surface or even free-standing. The term "free-standing motifs" is understood to mean motifs which consist of at least two parts not connected to one each other.

As adhesive agents, conventional heat-sensitive and/or pressure-sensitive adhesives for screen print transfer systems may be used. A suitable adhesive agent is, for example, the adhesive available under the commercial name Metratan FT 421 from the company Sericol Co.

The adhesive agents can be, in particular in the hardened state, transparent, translucent, colored translucent, or colored-covering.

In a preferred embodiment, the adhesive agent is colored white. Due to the white basis thus prepared, on which the reflection ink will be applied later, a transfer can be manufactured with which, after the application on the substrate, the constituents of the reflection ink which provide the color can be utilized in a particular advantageous manner.

Due to the use of a white basis, the coloring effect is reinforced, the colors become more intense, and the color sequences are more uniform. The reflections also appear more strongly.

In particular, a possibly interfering influence from the substrate's own color on the colored appearance of the transfer will be avoided as a result.

In an optional process step, the adhesive agent layer can be dried on the base medium. This can be effected by means of a drying stretch or another known possibility.

In the following process step, the reflection ink is imprinted on the adhesive agent layer in the screen print process. If it is intended that a motif should be displayed, it is imprinted with the correct side in a plan view. The print can be effected in the conventional manner in one or more colors.

Following, a drying step is carried out, in which the printed reflection ink and, if applicable, the adhesive agent layer, is dried. This can be effected by a drying stretch or other known possibilities.

The finished transfer, being formed from the adhesive agent layer and the reflection ink and being present on the base medium, can be coated or covered over, preferably full-surface, with a self-adhering flexible transfer medium. The inherently known transfer medium may consist of a film or a paper, coated with a conventional transfer adhesive. After the transfer medium has been mounted, the transfer can be brought to the application step. The application step in this context is not bound either temporally or spatially to the manufacture of the transfer.

For the applying step, the base medium is removed from the transfer and the layer of the adhesive agent is exposed. The transfer is placed on the substrate with the adhesive layer and imprinted on it with a transfer press, using heat and/or pressure. In this case, the adhesive combines with the individual substrate. In the home sector, transferring can even be carried out by means of a laundry iron, for example.

Finally, the transfer medium is removed from the now coated substrate, after cooling if appropriate.

The reflection inks used in the process according to the invention are inks of which the reflection capabilities for impinging light are based on the fact that reflecting particles are present in the ink mass. The reflecting particles may consist of metal, glass, metal-coated glass, or metal-coated plastic. The reflection particles can be spherical or almost spherical, or take the form of chips or needles. The diameter of the spherical or almost spherical particles is in the range from 10 to 110 µm, preferably from 25 to 40 µm. The longitudinal extension of the chips or needles is in the range from 10 to 110 μm, and preferably from 40 to 80 μm.

The ink mass may further contain one or more pigments, as a result of which the appearance and impression in daylight is improved. The reflection also appears colored in darkness.

The process according to the invention makes use, in an advantageous manner, of the realization that, due to the process step of drying the reflection ink applied, the reflection properties are clearly improved. By means of this step, a transfer is manufactured which has the handling advantages of a transfer and, at the same time, provides a reflection capability which has hitherto only been achieved by the direct screen print process.

Without any intention to be restricted to this, it is assumed that, by the process step of drying and hardening, the situation is reached that the reflection particles-raised above the ink layer are fixed in this position. This effect is supported by the fact that, during the drying process, a volume loss of the ink layer and thereby, a reduction in the thickness of the layer, in particular by the loss of water and/or solvents, occur. Due to the reduction in the layer thickness during the drying and hardening process respectively, it may happen that further reflection particles protrude from the surface of the ink layer and are therefore available for the purpose of reflection. The reflection particles may protrude by about 30% of their diameter or their longitudinal extension from the surface of the dried ink layer.

In a further embodiment of the present invention, an additional intermediate layer of an ink is imprinted on the adhesive agent layer, said ink not being a reflection ink.

The reflection ink is then imprinted on this intermediate layer.

Imprinting of the intermediate layer on the adhesive agent layer and/or the imprinting of the reflection ink on the intermediate layer can, as before, be carried out as wet-on-wet or with drying steps interspersed.

The intermediate layer can be formed by imprinting any desired single-component or two-component printing inks for the screen-printing process. The ink used for the formation of the intermediate layer is preferably a high-covering ink, whereby, depending on the motif or color effect which is desired, any desired color shade can be chosen. Suitable inks are marketed under the commercial name NB 021 from the company Sericol Co. and under the commercial name Maraflor TK from the company Marabu Co.

The ink for the formation of the intermediate layer can be imprinted in the same thickness as the adhesive agent layer and/or the reflection ink, but the layer thickness is preferably from 5 to 50 μtm, and more preferably from 10 to 20 μm.

Due to the use of the intermediate layer referred to, a transfer according to the invention is formed which, in comparison with the transfer according to the invention without an intermediate layer, provides increased tensile strength and tear resistance. The printing inks used as the intermediate layer also usually provide a higher ink coverage than colored transfer adhesive agents, as a result of which the advantageous properties such as are obtained with the use of colored transfer adhesives, are achieved to an enhanced degree.

The combination of an adhesive layer made of a transparent or translucent adhesive with a high-covering intermediate layer of white ink is particularly advantageous. When applying the transfer onto the substrate, in particular using hot transfer under pressure, the adhesive agent can flow into the upper layer of the substrate and emerge in small quantities laterally between the transfer and the substrate and form an edge around the transfer which has been applied. Using a colored adhesive agent may lead to undesirable colored edges. Using the combination referred to heretofore, there is no flowing of the hardened intermediate ink layer, so that no colored edge is formed around the transfer which has been applied. Emerging colorless adhesive does indeed continue to form an edge around the transfer which has been applied, but in this case, no undesirable colored edge is formed due to the transparency of the adhesive agent.

In a further embodiment, the reflection ink and the transfer adhesive can be applied to the base medium in a single process step. In this case, the optional intermediate layer for a separate ink application can be omitted.

For the joint application of the adhesive agent and the reflection ink, a mixture of the two can be manufactured, whereby the mixture is then applied in a single process step.

The adhesive agent/reflection ink mixture according to the present invention is also to be understood to mean formulations which are already pre-manufactured and which comprise a transparent, translucent, or colored adhesive agent, as well as the reflection particles. The transfer adhesive on a plastisol base containing the reflection particles is in particular well suitable. Such plastisol adhesives containing reflection particles are known and are marketed commercially.

In the embodiment in which the transfer adhesive agent/reflection ink mixture or the transfer adhesive agent containing reflection particles is applied in a single step, the process adopted is the following:

First, the base medium with an adhesive-repellent surface is applied. The transfer adhesive/reflection mixture or the transfer adhesive containing reflection particles is imprinted on the adhesive-repellent surface in the screen print process.

As far as motifs are to be represented, they are imprinted with the correct side. Using multi-colored motifs, the individual colored transfer adhesive/reflection ink mixtures or transfer adhesives containing reflection particles are imprinted on the respective areas of the base medium. Using multi-colored motifs, the print can be effected wet-on-wet, or the individual areas can be dried between the individual printing steps.

Finally, a drying step is carried out, in which the reflection particles are raised in the manner described heretofore above the surface of the imprinted mixture or adhesive agent, as far as this has not already taken place in the optional intermediate drying steps.

The finished transfer which is located on the base medium can, as described heretofore, be drawn over with a self-adhesive flexible transfer medium.

This embodiment provides the further advantage that, during the manufacture of the transfer, one process step, namely applying or printing of a separate transfer adhesive layer, can be omitted.

On the other hand, using transfers of this kind having one printed layer only, particular care must be taken when applying by the use of a transfer press, since the adhesive is softened during the-application in order to be applied onto the surface of the substrate or in order to be able to penetrate into it. At the same time, the bed in which the reflection particles are embedded and above the surface of which they are to be raised is likewise softened. During the application, caution is also to be exercised to ensure that the pressure of the transfer press or the like on the raised reflection particles is not so high that they are pressed completely into their bed, as a result of which the reflection property would to a large extent be lost. A slight imprinting of the reflection particles on the softened bed can however be effected within the scope of the invention, provided that the reflection properties are not substantially influenced in a disadvantageous manner.

The invention is explained on the basis of figures and embodiments hereinafter in more detail.

DETAILED DESCRIPTION OF INVENTION

Figure 1:
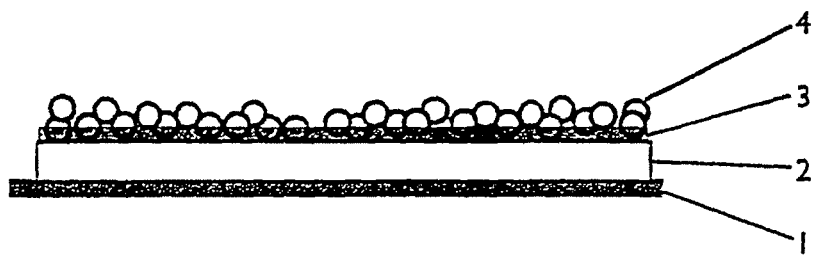
FIG. 1 shows a transfer, which was manufactured according to the process according to the invention, after the process step of the drying of the reflection ink.

FIG. 1 shows a transfer after the process step of drying the ink layer consisting of the base medium 1 onto which the transfer adhesive 2 is imprinted in the screen print process. The ink layer 3 is imprinted on the transfer adhesive 2 with the correct side in the screen print process. At least a part of the reflection particles 4 contained in the ink layer 3 are raised by part of their circumference above the exposed surface of the dried and hardened ink layer.

Figure 2:
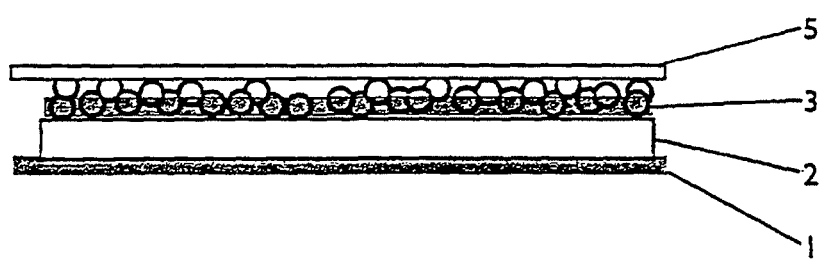
FIG. 2 shows a transfer which was manufactured according to the process according to the invention with a transfer film applied.

FIG. 2 shows a reflection transfer as in FIG. 1 manufactured according to the process according to the invention, whereby a transfer film 5 provided with an adhesive agent has been additionally applied on the ink layer 3. In this case, the reflection particles 4 are no longer pressed by means of the transfer film 5 into the hardened ink-layer 3.

Figure 3:
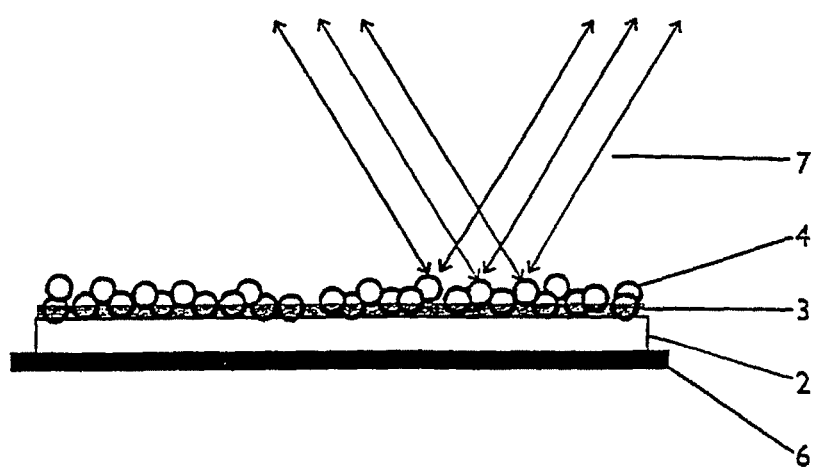
FIG. 3 shows a transfer which was manufactured according to the process according to the invention which has been applied to a substrate and is exposed to light.

FIG. 3 shows a reflection transfer manufactured according to the process according to the invention and comprising the transfer adhesive 2, the dried and hardened ink layer 3 with the raised reflection particles 4, whereby the transfer is applied onto the substrate 6. The impinging light rays 7 which are reflected by the reflection particles 4 can be seen additionally.

Figure 4:
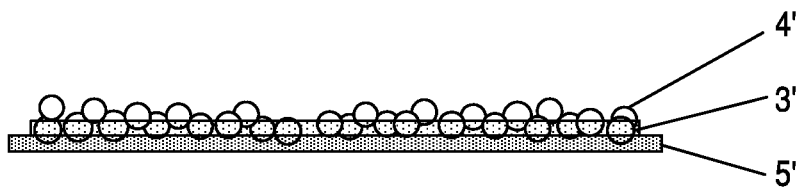
FIG. 4 shows a transfer according to the prior art in which the reflection ink has been applied onto the transfer carrier.

FIG. 4 shows a transfer according to the prior art in the manufacturing step, whereby the reflection ink 3' is applied onto the transfer carrier 5'. In this case, the side of the ink layer 3', later forming the surface turned towards the light, is turned towards the transfer carrier 5'. The reflection particles 4' are raised up on the side of the ink layer 2' and being directed towards the substrate later. Due to the contact of the ink layer 3' with the transfer carrier 5', the reflection particles 4' cannot protrude from the later external surface of the ink layer 3'.

Figure 5:
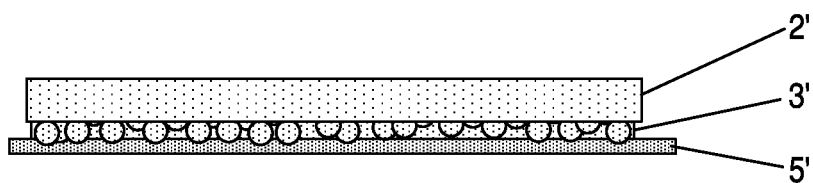
FIG. 5 shows a transfer according to the prior art according to FIG. 4 whereby a transfer adhesive has further been applied.

FIG. 5 shows a transfer according to the prior art in the manufacturing step, in which the transfer adhesive 2' has been applied onto the reflection ink 3'. In this case, it can be recognized that the reflection particles 4' raised above the surface of the ink layer 3' are embedded into the transfer adhesive 2'.

Figure 6:
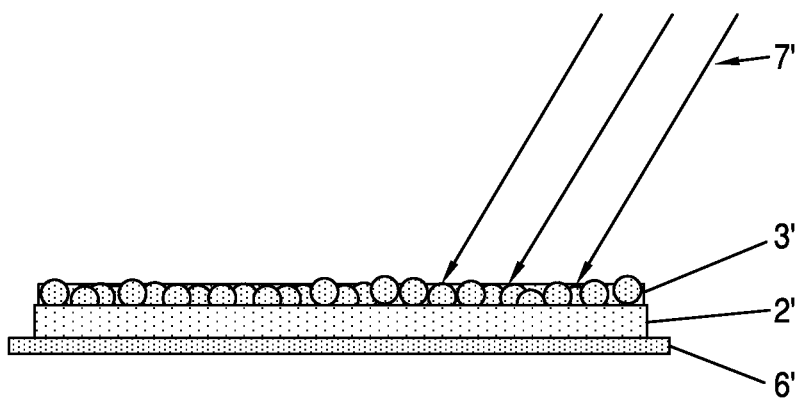
FIG. 6 shows a transfer according to the prior art which has been applied to the substrate and is exposed to light.

FIG. 6 shows a transfer according to the prior art which is applied to a substrate 6, whereby the transfer adhesive 2' is located between the substrate 6 and the ink layer 3'. The side of the ink layer 3' directed towards the impinging light 7 does not provide any raised reflection particles 4'. Due to the reflection particles 4' embedded in the ink layer 3' and the transfer adhesive 2', the impinging light beam 7 is only inadequately reflected back and shows practically no reflection effect.

Figure 7:
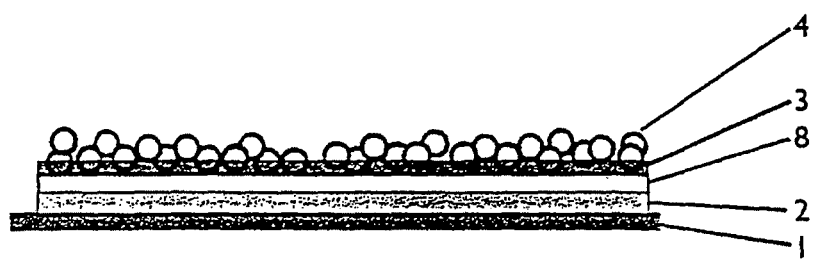
FIG. 7 shows a transfer manufactured according to the process according to the invention after the process step of the drying of the reflection ink, whereby an intermediate layer is located between the adhesive agent layer and reflection ink layer.

FIG. 7 shows a transfer according to the invention after the operational step of drying the ink layer, consisting of the base medium 1 on which the transfer adhesive 2 is imprinted in the screen print process. In the screen print process, the intermediate layer 8 is imprinted on the transfer adhesive 2 with the correct side. The ink layer 3 is imprinted on the intermediate ink layer 8. At least a part of the reflection particles 4 contained in the ink layer 3 protrude with a part of their circumference from the exposed surface of the dried and hardened ink layer.

EXAMPLES

Embodiment 1

In a fully-automatic screen printing machine equipped with a screen printing frame with a fabric stretch of 21-77, a doctor blade of multilayered polyurethane and a float blade of metal, a silicone-coated paper of the type NP 950 from Laufenberg GmbH is placed as the base medium. Next, a transfer adhesive of the type FT 421 from the company Sericol Co. is imprinted in a layer thickness of 100 to 300 μm. The transfer adhesive is dried in a drying stretch with an infra-red dryer at a drying temperature of between 80-120° C. The reflection ink or a mixture of reflection inks is imprinted on the transfer adhesive in a wet layer thickness of 100 to 300 μm. Drying then takes place in a drying stretch with an infra-red dryer at a drying temperature of between 80-120° C. A transfer medium is applied onto the finished transfer, made of a paper provided with adhesive.

Embodiment 2

In a screen printing machine as was used in Example 1, a silicone-coated paper of the type NP 950 from Laufenberg GmbH is placed as the base medium. Following, a transparent transfer adhesive of the type Metraton FT 421 from the company Sericol Co. is imprinted in a layer thickness from 100 to 200 μm and is dried in a drying stretch with an infra-red dryer at a temperature of between 80-120° C. An intermediate layer about 20 μm thick of NB 021 from the company Sericol Co. is imprinted on the transfer adhesive in a white color tone and is likewise dried. A reflection ink of the type Reflek 100 from the company Sericol Co. is imprinted on the dried intermediate layer in a thickness from 100 to 120 μm. This is followed by air drying. A transfer medium made of a paper provided with an adhesive is applied onto the finished transfer.

Embodiment 3

In a screen printing machine as used in Example 1, a silicone-coated paper of the type NP 950 is placed as the base medium. Then, reflection particles-containing a colored transfer adhesive are imprinted in a layer thickness from 100 to 250 μm and dried in a drying stretch at a temperature of between 50° C. and 120° C. A transfer medium of a paper provided with an adhesive agent is applied onto the finished transfer.

The invention claimed is:

1. A reflection transfer formed from the following steps:
    providing an adhesive-repellant base medium;
    applying a transfer adhesive on the adhesive-repellent base medium;
    drying the transfer adhesive;
    imprinting a non-reflective intermediate ink layer comprising white or colored ink on the transfer adhesive; and imprinting a reflection ink layer comprising a colored ink and a plurality of reflection particles onto said non-reflective intermediate ink layer.

2. A reflection transfer according to claim 1, wherein said reflection ink layer forms a desired motif that is imprinted with a correct side in a plan view.

3. A reflection transfer according to claim 2, further comprising drying the reflection ink layer such that the plurality of reflection particles protrude above a surface of the reflection ink layer.

4. A reflection transfer according to claim 3, further comprising applying a transfer film onto the reflection ink layer.

5. The reflection transfer as in claim 1, wherein the adhesive-repellent base medium comprises a paper or plastic film coated with a silicone or wax.

6. The reflection transfer as in claim 1, wherein the transfer adhesive comprises a heat-sensitive or pressure sensitive adhesive.

7. The reflection transfer as in claim 1, wherein the transfer adhesive is transparent or translucent.

8. A method for forming a reflection transfer, comprising, in sequence:
providing an adhesive-repellant base medium;
applying a transfer adhesive on the adhesive-repellent base medium;
drying the transfer adhesive;
imprinting a non-reflective intermediate ink layer comprising white or colored ink on the transfer adhesive; and
imprinting a reflection ink layer comprising a colored ink and a plurality of reflection particles onto said non-reflective intermediate ink layer.

9. A method according to claim 8, wherein said reflection ink layer forms a desired motif with a correct side in a plan view.

10. A method according to claim 8, further comprising drying the reflection ink layer such that the plurality of reflection particles protrude above a surface of the reflection ink layer.

11. A method according to claim 10, further comprising applying a transfer film on the reflection ink layer.

12. A method according to claim 8, wherein the adhesive-repellent base medium comprises a paper or plastic film coated with a silicone or wax.

13. A method according to claim 8, wherein the transfer adhesive comprises a heat-sensitive or pressure sensitive adhesive.

14. A method according to claim 8, wherein the transfer adhesive is transparent or translucent.

* * * * *